US012634718B2

(12) United States Patent
Li et al.

(10) Patent No.: US 12,634,718 B2
(45) Date of Patent: May 19, 2026

(54) WIRELESS RESOURCE UTILIZATION RATE DETERMINATION METHOD AND APPARATUS, ELECTRONIC DEVICE AND STORAGE MEDIUM

(71) Applicant: China United Network Communications Group Company Limited, Beijing (CN)

(72) Inventors: Yi Li, Beijing (CN); Guanghai Liu, Beijing (CN); Fei Li, Beijing (CN); Yuchao Jin, Beijing (CN); Xiaomeng Zhu, Beijing (CN); Yuting Zheng, Beijing (CN); Tian Xiao, Beijing (CN); Yongbei Xue, Beijing (CN); Yuwei Jia, Beijing (CN); Xinzhou Cheng, Beijing (CN)

(73) Assignee: China United Network Communications Group Company Limited, Beijing (CN)

( * ) Notice: Subject to any disclaimer, the term of this patent is extended or adjusted under 35 U.S.C. 154(b) by 294 days.

(21) Appl. No.: 18/292,715

(22) PCT Filed: Jun. 9, 2022

(86) PCT No.: PCT/CN2022/097949
§ 371 (c)(1),
(2) Date: Jan. 26, 2024

(87) PCT Pub. No.: WO2023/005448
PCT Pub. Date: Feb. 2, 2023

(65) Prior Publication Data
US 2024/0340657 A1 Oct. 10, 2024

(30) Foreign Application Priority Data
Jul. 27, 2021 (CN) .......................... 202110860391.4

(51) Int. Cl.
*H04W 24/02* (2009.01)

(52) U.S. Cl.
CPC .................................. *H04W 24/02* (2013.01)

(58) Field of Classification Search
CPC ... H04W 24/02; H04W 24/08; H04W 72/535; H04W 72/0446; H04W 72/0453;
(Continued)

(56) References Cited

U.S. PATENT DOCUMENTS 10,477,413 B2 * 11/2019 Liao ...................... H04W 16/24
10,798,743 B2 * 10/2020 Patil .................... H04W 74/006
(Continued)

FOREIGN PATENT DOCUMENTS

CN 101909321 A 12/2010
CN 104936188 A 9/2015
(Continued)

OTHER PUBLICATIONS

First Office Action, CN 202110860391.4, Nov. 24, 2022.
(Continued)

*Primary Examiner* — Abdullahi E Salad
(74) *Attorney, Agent, or Firm* — XSENSUS LLP

(57) ABSTRACT

The present disclosure provides a method and an apparatus for determining a utilization rate of wireless resources, an electronic device and a storage medium. The method includes acquiring communication data within a statistical period of a cell; determining a channel non-space division occupied wireless resource within the statistical period; determining a channel space division occupied wireless resource within the statistical period; determining a channel available wireless resource within the statistical period; and determining the utilization rate of wireless resources.

20 Claims, 3 Drawing Sheets

(58) Field of Classification Search
CPC .... H04W 72/046; H04B 7/0452; H04L 5/003; H04L 41/142
See application file for complete search history.

(56) References Cited

U.S. PATENT DOCUMENTS

| | | | |
|---|---|---|---|
| 2011/0183678 A1 | 7/2011 | Kerpez et al. | |
| 2016/0080952 A1* | 3/2016 | Zhuang | H04L 41/0213 370/242 |
| 2017/0048881 A1* | 2/2017 | Goria | H04W 72/542 |
| 2018/0310342 A1* | 10/2018 | Patil | H04W 74/006 |
| 2020/0336181 A1* | 10/2020 | Cao | H04B 17/336 |
| 2021/0360631 A1* | 11/2021 | Cirik | H04L 1/0073 |
| 2021/0377940 A1* | 12/2021 | Lee | H04W 72/23 |
| 2023/0283345 A1* | 9/2023 | Muruganathan | H04L 5/005 370/329 |
| 2024/0032018 A1 | 1/2024 | Ramachandra et al. | |

FOREIGN PATENT DOCUMENTS

| | | |
|---|---|---|
| CN | 106612212 A | 5/2017 |
| CN | 109802806 A | 5/2019 |
| CN | 109842948 A | 6/2019 |
| CN | 109996258 A | 7/2019 |
| CN | 110167148 A | 8/2019 |
| CN | 110740450 A | 1/2020 |
| CN | 111464248 A | 7/2020 |
| CN | 111866902 A | 10/2020 |
| CN | 111866931 A | 10/2020 |
| CN | 111885625 A | 11/2020 |
| CN | 112135309 A | 12/2020 |
| CN | 112203322 A | 1/2021 |
| CN | 112243258 A | 1/2021 |
| CN | 113573351 A | 10/2021 |
| CN | 113891361 A | 1/2022 |
| CN | 113891363 A | 1/2022 |
| CN | 114125896 A | 3/2022 |
| CN | 114828270 A | 7/2022 |
| CN | 115334525 A | 11/2022 |
| JP | 2023549175 A | 11/2023 |
| WO | 2019007241 A1 | 1/2019 |

OTHER PUBLICATIONS

International Search Report, PCT/CN2022/097949, Aug. 18, 2022.
CMCC, "Introduction of MIMO layer based PRB usage measurement", 3GPP TSG-RAN WG2 Meeting #111 electronic, Online, Nov. 2-13, 2020, R2-2010656.
China Mobile et al., "pCR 28.552 Add PRB Usage measurements", 3GPP TSG SA WG5 (Telecom Management) Meeting #119, May 14-18, 2018, La Jolla US, S5-183207.
ZTE et al., "Modify PRB usage measurements", 3GPP TSG SA WG5 (Telecom Management) Meeting #130e, Apr. 20-28, 2020, E-meeting, S5-202210.
"3rd Generation Partnership Project; Technical Specification Group Radio Access Network; NR; Layer 2 Measurements; (Release 17)", 3GPP TS 38.314, V17.3.0, Jun. 2023, 33 pages.
3rd Generation Partnership Project; Technical Specification Group Services and System Aspects; Management and orchestration; 5G performance measurements (Release 17), 3GPP TS 28.552, V17.6.0, Mar. 2022, 307 pages.
"Add enhanced MIMO PRB Usage for cell", 3GPP TSG-SA5 Meeting #140-e, S5-216546, China Unicom, Nov. 5, 2021, 3 pages.
"Discussion on enhanced MIMO PRB Usage for cell", 3GPP TSG-SA5 Meeting #140-e, S5-216547, China Unicom, 5 pages.
"Discussion on measurement of scheduled layer number", 3GPP TSG-SA5 Meeting #139-e, S5-215196, China Unicom, 2 pages.
"Meeting Report for TSG SA WG5 meeting: e", Third Generation Partnership Project (3GPP), Electronic meeting, online, Nov. 15, 2021 to Mar. 24, 2021, 141 pages.
"Meeting Report for TSG SA WG5 meeting: 139e", Third Generation Partnership Project (3GPP), Electronic meeting, online, Nov. 10, 2021 to Oct. 20, 2021, 146 pages.
"Rel-17 CR 28.552 Add Time-domain average Maximum Scheduled Layer Number for MIMO scenario", 3GPP TSG-SA5 Meeting #139-e, S5-215650, China Unicom, Sep. 30, 2021, 3 pages.

* cited by examiner

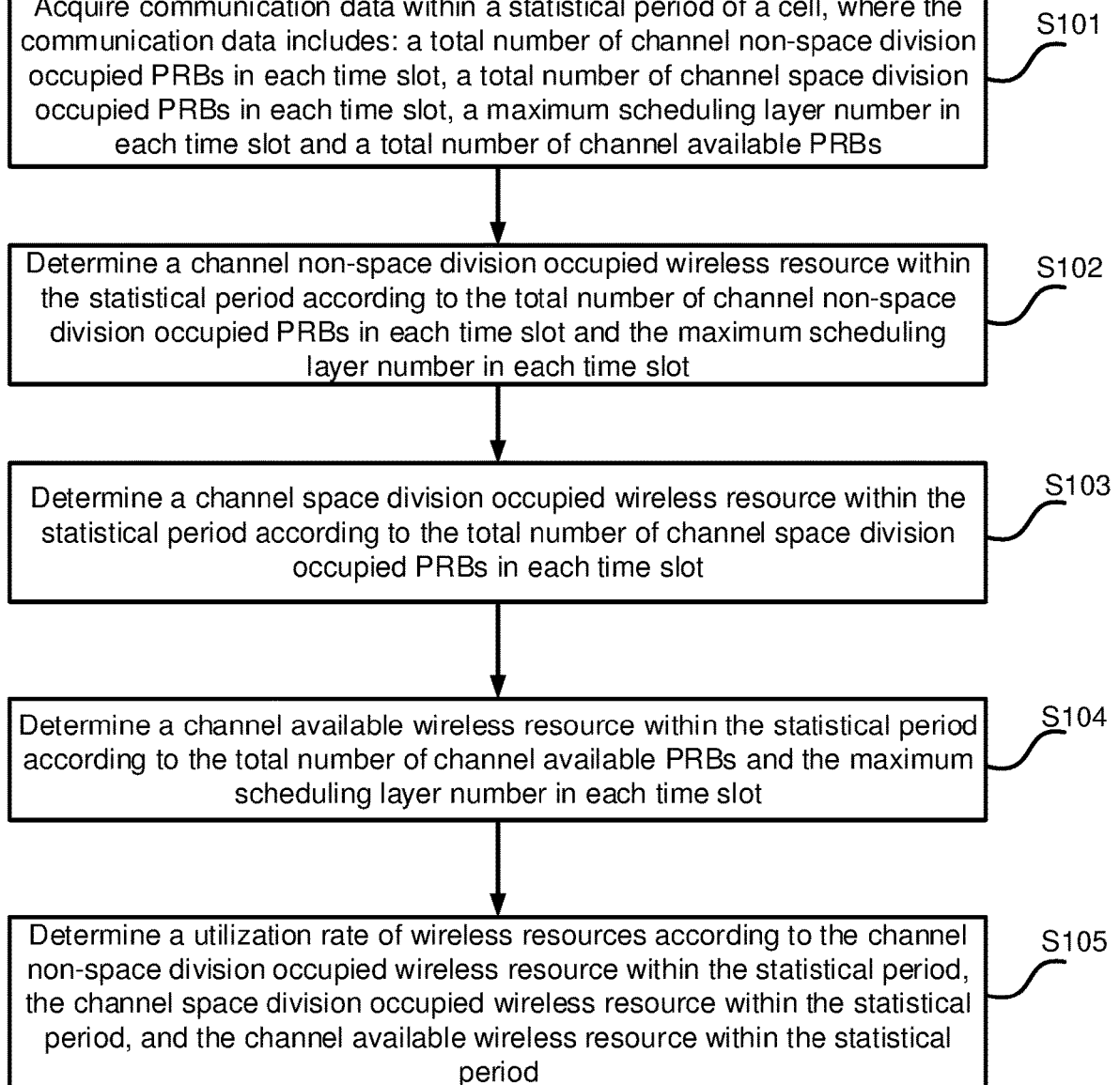

Acquire communication data within a statistical period of a cell, where the communication data includes: a total number of channel non-space division occupied PRBs in each time slot, a total number of channel space division occupied PRBs in each time slot, a maximum scheduling layer number in each time slot and a total number of channel available PRBs — S101

Determine a channel non-space division occupied wireless resource within the statistical period according to the total number of channel non-space division occupied PRBs in each time slot and the maximum scheduling layer number in each time slot — S102

Determine a channel space division occupied wireless resource within the statistical period according to the total number of channel space division occupied PRBs in each time slot — S103

Determine a channel available wireless resource within the statistical period according to the total number of channel available PRBs and the maximum scheduling layer number in each time slot — S104

Determine a utilization rate of wireless resources according to the channel non-space division occupied wireless resource within the statistical period, the channel space division occupied wireless resource within the statistical period, and the channel available wireless resource within the statistical period — S105

FIG. 1

WIRELESS RESOURCE UTILIZATION RATE DETERMINATION METHOD AND APPARATUS, ELECTRONIC DEVICE AND STORAGE MEDIUM

CROSS-REFERENCE TO RELATED APPLICATIONS

This application is the United States national phase of International Patent Application No. PCT/CN2022/097949, filed Jun. 9, 2022, and claims priority to Chinese Patent Application No. 202110860391.4, filed Jul. 27, 2021, the disclosures of which are hereby incorporated by reference in their entireties.

BACKGROUND OF THE INVENTION

Field of the Invention

The present disclosure relates to the field of communication technology, and in particular, to a method and an apparatus for determining a utilization rate of wireless resources, an electronic device, and a storage medium.

Description of Related Art

In the related art, a utilization rate of wireless resources in 5G network is calculated based on a maximum capability of the network, i.e., the utilization rate of wireless resources is calculated based on a full bandwidth physical resource block (PRB) and a maximum number of configured layers. A utilization rate of wireless resources determined through this method is too low to truly and effectively reflect a load situation of a network.

SUMMARY OF THE INVENTION

Embodiments of the present disclosure provide a method and an apparatus for determining a utilization rate of wireless resources, an electronic device, and a storage medium, so as to solve a problem that the utilization rate of wireless resources is too to truly and effectively reflect a load situation of a network.

In order to achieve the above-mentioned purpose, the embodiments of the present disclosure adopt the following technical solutions.

According to a first aspect of the present disclosure, a method for determining a utilization rate of wireless resources is provided. The method for determining a utilization rate of wireless resources includes: acquiring communication data within a statistical period of a cell, where the communication data includes: a total number of channel non-space division occupied PRBs in each time slot, a total number of channel space division occupied PRBs in each time slot, a maximum scheduling layer number in each time slot and a total number of channel available PRBs; determining a channel non-space division occupied wireless resource within the statistical period according to the total number of channel non-space division occupied PRBs in each time slot and the maximum scheduling layer number in each time slot; determining a channel space division occupied wireless resource within the statistical period according to the total number of channel space division occupied PRBs in each time slot; determining a channel available wireless resource within the statistical period according to the total number of channel available PRBs and the maximum scheduling layer number in each time slot; and determining the utilization rate of wireless resources, according to the channel non-space division occupied wireless resource within the statistical period, the channel space division occupied wireless resource within the statistical period, and the channel available wireless resource within the statistical period.

In an implementation, the channel non-space division occupied wireless resource within the statistical period satisfies the following formula:

$$T1 = \sum_{i=1}^{n} PRB_i * \text{Layer}_i$$

where the T1 characterizes the channel non-space division occupied wireless resource within the statistical period, the i characterizes an i-th time slot within the statistical period, the $PRB_i$ characterizes a total number of channel non-space division occupied PRBs in the i-th time slot, and the $\text{Layer}_i$ characterizes the maximum scheduling layer number in the i-th time slot within the statistical period, n is a positive integer.

In another implementation, the channel space division occupied wireless resource within the statistical period satisfies the following formula:

$$T2 = \sum_{i=1}^{n} \left( \sum_{j=1}^{m} PRB_{i,j} * j \right)$$

where the T2 characterizes the channel space division occupied wireless resource within the statistical period, the i characterizes an i-th time slot within the statistical period, the $PRB_{i,j}$ characterizes a number of channel space division occupied PRBs occupying j layers in the i-th time slot, and the j characterizes an occupied layer number; n is a positive integer, m is a positive integer, and j is a positive integer.

In another implementation, the determining the channel available wireless resource within the statistical period according to the total number of channel available PRBs and the maximum scheduling layer number in each time slot includes: determining an average maximum scheduling layer number within the statistical period according to maximum scheduling layer numbers in respective time slots; and determining the channel available wireless resource within the statistical period according to the total number of channel available PRBs and the average maximum scheduling layer number within the statistical period.

In another implementation, the average maximum scheduling layer number within the statistical period satisfies the following formula:

$$L = \frac{\sum_{i=1}^{n} \text{Layer}_i}{k}$$

where the L characterizes the average maximum scheduling layer number within the statistical period, the i characterizes an i-th time slot within the statistical period, the $\text{Layer}_i$ characterizes a maximum scheduling layer number in the i-th time slot, and the k characterizes a number of time slots with the maximum scheduling layer number; n is a positive integer, $\text{Layer}_i$ is a positive integer, and k is a positive integer.

In another implementation, the channel available wireless resource within the statistical period satisfies the following formula:

$$T3 = B * L * n$$

where the T3 characterizes the channel available wireless resource within the statistical period, the L characterizes the average maximum scheduling layer number within the statistical period, the n characterizes a number of time slots within the statistical period, n is a positive integer and the B characterizes a configured number of PRBs in each time slot.

In another implementation, the utilization rate of wireless resources satisfies the following formula:

the utilization rate of wireless resources=(the channel non-space division occupied wireless resource within the statistical period+the channel space division occupied wireless resource within the statistical period)/the channel available wireless resource within the statistical period.

In another implementation, before the acquiring the communication data within the statistical period of the cell, the method for determining an utilization rate of wireless resources further includes: acquiring MIMO configuration information of the cell; determining whether a MU-MIMO mode is enabled for the cell according to the MIMO configuration information; and acquiring the communication data within the statistical period of the cell in a case where the MU-MIMO mode is determined to be enabled for the cell.

In another implementation, the method for determining an utilization rate of wireless resources further includes: acquiring a total number of channel occupied PRBs and a total number of channel available PRBs within the statistical period in a case where the MU-MIMO mode is determined to be not enabled for the cell; and determining the utilization rate of wireless resources according to the total number of channel occupied PRBs and the total number of channel available PRBs within the statistical period.

According to a second aspect of the present disclosure, a method for determining a utilization rate of wireless resources is provided. The method for determining a utilization rate of wireless resources includes: acquiring communication data within a statistical period of a cell, where the communication data includes: a total number of channel space division occupied PRBs in each time slot, a maximum scheduling layer number in each time slot, and a total number of channel available PRBs; determining a channel space division occupied wireless resource within the statistical period according to the total number of channel space division occupied PRBs in each time slot; determining a channel available wireless resource within the statistical period according to the total number of channel available PRBs and the maximum scheduling layer number in each time slot; and determining the utilization rate of wireless resources according to the channel space division occupied wireless resource within the statistical period and the channel available wireless resource within the statistical period.

In an implementation, the channel space division occupied wireless resource within the statistical period satisfies the following formula:

$$T2 = \sum_{i=1}^{n}\left(\sum_{j=1}^{m} PRB_{i,j} * j\right)$$

where the T2 characterizes the channel space division occupied wireless resource within the statistical period, the i characterizes an i-th time slot within the statistical period, the $PRB_{i,j}$ characterizes a number of channel space division occupied PRBs occupying j layers in each time slot, and the j characterizes an occupied layer number; n is a positive integer, m is a positive integer, and j is a positive integer.

In another implementation, the determining the channel available wireless resource within the statistical period according to the total number of channel available PRBs and the maximum scheduling layer number in each time slot includes: determining an average maximum scheduling layer number within the statistical period according to maximum scheduling layer numbers for respective time slots; and determining the channel available wireless resource within the statistical period according to the total number of channel available PRBs and the average maximum scheduling layer number within the statistical period.

In another implementation, the average maximum scheduling layer number within the statistical period satisfies the following formula:

$$L = \frac{\sum_{i=1}^{n} \text{Layer}_i}{k}$$

where the L characterizes the average maximum scheduling layer number within the statistical period, the i characterizes an i-th time slot within the statistical period, the $\text{Layer}_i$ characterizes a maximum scheduling layer number in the i-th time slot, and the k characterizes a number of time slots with the maximum scheduling layer number; n is a positive integer, $\text{Layer}_i$ is a positive integer, and k is a positive integer.

In another implementation, the channel available wireless resource within the statistical period satisfies the following formula:

$$T3 = B * L * n$$

where the T3 characterizes the channel available wireless resource within the statistical period, the L characterizes the average maximum scheduling layer number within the statistical period, the n characterizes a number of time slots within the statistical period, n is a positive integer and the B characterizes a configured number of PRBs in each time slot.

In another implementation, the channel available wireless resource within the statistical period satisfies the following formula:

$$T3 = \sum_{i=1}^{n} B_i * L$$

US 12,634,718 B2

5 where the T3 characterizes the channel available wireless resource within the statistical period, the L characterizes the average maximum scheduling layer number within the statistical period, the i characterizes an i-th time slot within the statistical period, the n characterizes a number of time slots within the statistical period, n is a positive integer and the $B_i$ characterizes a configured number of PRBs in the i-th time slot.

In another implementation, the utilization rate of wireless resources satisfies the following formula:

the utilization rate of wireless resources=the channel space division occupied wireless resource within the statistical period/the channel available wireless resource within the statistical period.

In another implementation, before the acquiring the communication data within the statistical period of the cell, the method for determining an utilization rate of wireless resources further includes: acquiring MIMO configuration information of the cell; determining whether a MU-MIMO mode is enabled for the cell according to the MIMO configuration information; and acquiring the communication data within the statistical period of the cell in a case where the MU-MIMO mode is determined to be enabled in the cell.

In another implementation, the method for determining an utilization rate of wireless resources further includes: acquiring a total number of channel occupied PRBs and a total number of channel available PRBs within the statistical period in a case where the MU-MIMO mode is determined to be not enabled for the cell; and determining the utilization rate of wireless resources according to the total number of channel occupied PRBs and the total number of channel available PRBs within the statistical period.

According to a third aspect of the present disclosure, a method for determining an average maximum scheduling layer number within a statistical period is provided. The method for determining an average maximum scheduling layer number within a statistical period includes: determining an average maximum scheduling layer number within a statistical period according to a maximum scheduling layer number in each time slot, where the average maximum scheduling layer number within the statistical period satisfies the following formula:

$$L = \frac{\sum_{i=1}^{n} \text{Layer}_i}{k}$$

where the L characterizes the average maximum scheduling layer number within the statistical period, the i characterizes an i-th time slot within the statistical period, the Layer_i characterizes a maximum scheduling layer number in the i-th time slot, and the k characterizes a number of time slots with the maximum scheduling layer number; n is a positive integer, Layer_i is a positive integer, and k is a positive integer.

According to a fourth aspect of the present disclosure, an apparatus for determining a utilization rate of wireless resources is provided. The apparatus for determining a utilization rate of wireless resources includes: an acquisition module, configured to perform: acquiring communication data within a statistical period of a cell, where the communication data includes: a total number of channel non-space division occupied PRBs in each time slot, a total number of channel space division occupied PRBs in each time slot, a maximum scheduling layer number in each time slot and a total number of channel available PRBs; and a determination module, configured to perform: determining a channel non-space division occupied wireless resource within the statistical period according to the total number of channel non-space division occupied PRBs in each time slot and the maximum scheduling layer number in each time slot; where the determination module is further configured to perform: determining a channel space division occupied wireless resource within the statistical period according to the total number of channel space division occupied PRBs in each time slot; the determination module is further configured to preform: determining a channel available wireless resource within the statistical period according to the total number of channel available PRBs and the maximum scheduling layer number in each time slot; and the determination module is further configured to perform: determining a utilization rate of wireless resources according to the channel non-space division occupied wireless resource within the statistical period, the channel space division occupied wireless resource within the statistical period, and the channel available wireless resource within the statistical period.

In an implementation, the channel non-space division occupied wireless resource within the statistical period satisfies the following formula:

$$T1 = \sum_{i=1}^{n} PRB_i * \text{Layer}_i$$

where the T1 characterizes the channel non-space division occupied wireless resource within the statistical period, the i characterizes an i-th time slot within the statistical period, the $PRB_i$ characterizes a total number of channel non-space division occupied PRBs in the i-th time slot, and the $\text{Layer}_i$ characterizes a maximum scheduling layer number in the i-th time slot within the statistical period, n is a positive integer.

In another implementation, the channel space division occupied wireless resource within the statistical period satisfies the following formula:

$$T2 = \sum_{i=1}^{n} \left( \sum_{j=1}^{m} PRB_{i,j} * j \right)$$

where T2 characterizes the channel space division occupied wireless resource within the statistical period, the i characterizes an i-th time slot within the statistical period, the $PRB_{i,j}$ characterizes a number of channel space division occupied PRBs occupying j layers in the i-th time slot, and the j characterizes an occupied layer number; n is a positive integer, m is a positive integer, and j is a positive integer.

In another implementation, the determination module is specifically configured to perform: determining an average maximum scheduling layer number within the statistical period according to maximum scheduling layer numbers for respective time slots; and determining a channel available wireless resource within the statistical period according to the total number of channel available PRBs and the average maximum scheduling layer number within the statistical period.

In another implementation, the average maximum scheduling layer number within the statistical period satisfies the following formula:

$$L = \frac{\sum_{i=1}^{n} \text{Layer}_i}{k}$$

where the L characterizes the average maximum scheduling layer number within the statistical period, the i characterizes an i-th time slot within the statistical period, the $\text{Layer}_i$ characterizes a maximum scheduling layer number in the i-th time slot, and k characterizes a number of time slots with the maximum scheduling layer number; n is a positive integer, $\text{Layer}_i$ is a positive integer and k is a positive integer.

In another implementation, the channel available wireless resource within the statistical period satisfies the following formula:

$$T3 = B * L * n$$

where the T3 characterizes the channel available wireless resource within the statistical period, the L characterizes the average maximum scheduling layer number within the statistical period, the n characterizes a number of time slots within the statistical period, n is a positive integer and B characterizes a configured number of PRBs in each time slot.

In another implementation, the utilization rate of wireless resources satisfies the following formula:

the utilization rate of wireless resources=(the channel non-space division occupied wireless resource within the statistical period+the channel space division occupied wireless resource within the statistical period)/the channel available wireless resource within the statistical period.

In another implementation, the apparatus for determining an utilization rate of wireless resources further includes a configuration module, configured to perform: acquiring MIMO configuration information of the cell; determining whether a MU-MIMO mode is enabled for the cell according to the MIMO configuration information; and acquiring the communication data within the statistical period of the cell in a case where the MU-MIMO mode is determined to be enabled for the cell.

In another implementation, the configuration module is further configured to perform: acquiring a total number of channel occupied PRBs and a total number of channel available PRBs within the statistical period in a case where the MU-MIMO mode is determined to be not enabled for the cell; and determining the utilization rate of wireless resources according to the total number of channel occupied PRBs and the total number of channel available PRBs within the statistical period.

According to a fifth aspect of the present disclosure, an electronic device is provided. The electronic device includes: a processor; and a memory for storing instructions executable by the processor; where the processor is configured to execute the instructions to implement the method according to the above-mentioned first, second and third aspects and any one of implementations thereof.

According to a sixth aspect of the present disclosure, a computer-readable storage medium is provided. When instructions in the computer-readable storage medium are executed by a processor of an electronic device, the electronic device is enabled to implement the method according to the above-mentioned first, second and third aspects and any one of implementations thereof.

The technical solutions provided in the present disclosure at least have the following beneficial effects: a channel non-space division occupied wireless resource and a channel available wireless resource are calculated by using a maximum scheduling layer number for a cell within a statistical period, and then, an utilization rate of wireless resources are determined according to the channel non-space division occupied wireless resource, the channel space division occupied wireless resource, and the channel available wireless resource, therefore a limitation of geographical environments of cells and an actual distribution of users on the wireless resource capability of the cell are taken into account, so that the accuracy of a calculating result of an utilization rate of wireless resources is improved and a load situation of a network truly and effectively reflected.

It should be understood that the general description above and the detailed description in the following are only illustrative and explanatory, and cannot limit the present disclosure.

BRIEF DESCRIPTION OF THE DRAWINGS

FIG. 1 is a flow chart illustrating a method for determining a utilization rate of wireless resources according to some exemplary embodiments;

DESCRIPTION OF THE INVENTION

Figure 2:
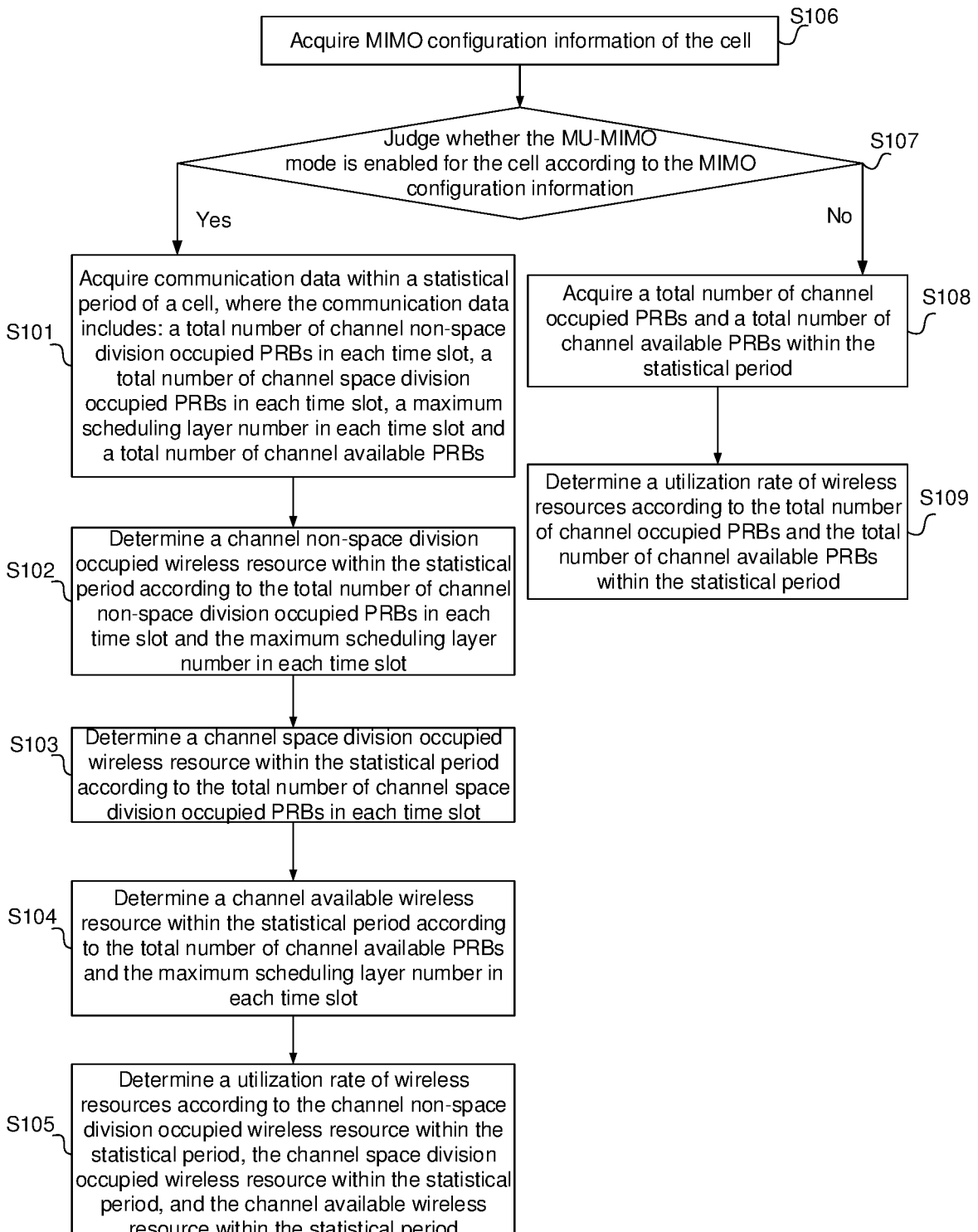
FIG. 2 is a flow chart illustrating another method for determining a utilization rate of wireless resources according to some exemplary embodiments.

The technical solutions in the embodiments of the present disclosure will be described below in combination with the accompanying drawings in the embodiments of the present disclosure. In the description of the present disclosure, unless otherwise stated, "/" means an "or" relationship between associated objects, for example, A/B may mean A or B; and "and/or" in the present disclosure is only used to describe an association relationship between associated objects and means the existence of three relationships, for example, A and/or B may mean: only A, A and B simultaneously, and only B, where A and B may be singular or plural. Moreover, in the description of the present disclosure, "multiple" means two or more than two, unless otherwise stated. "At least one (item) in the following" or similar expressions refer to any combination of these items, including any combination of single (item) or plural (items). For example, at least one of a, b, or c may mean: a, b, c, a and b, a and c, b and c, or a and b and c, where a, b and c may be single or plural. In addition, in order to facilitate clear description of the technical solutions of the embodiments of the present disclosure, in the embodiments of the present disclosure, the words, such as "first" and "second", are used to distinguish identical or similar items with basically the same functions and effects. Those skilled in the art can understand that the words, such as "first" and "second", do not limit a number and an execution order, and the words, such as "first" and "second", do not necessarily limit existence of differences between a first item and a second item. Meanwhile, in the embodiments of this disclosure, the words, such as "exemplary" or "for example", are used as an example, an illustration, or an explanation. Any embodiment or design solution described with "exemplarily" or "for example" in the embodiments of the present disclosure is not necessarily to be construed as preferred or advantageous over other embodiments or design solutions. To be precise, the usage of the words, such as "exemplarily" or "for example", is intended to present relevant concepts in a specific manner for better understanding.

In addition, a network architecture and a business scenario described in the embodiments of the present disclosure are used for a purpose of explaining the technical solutions of the embodiments of the present disclosure more clearly, and do not constitute a limitation on the technical solutions provided in the embodiments of the present disclosure. Those of ordinary skill in the art should know that, with the evolution of the network architecture and the emergence of new business scenarios, the technical solutions provided in the embodiments of the present disclosure are also applicable to similar technical problems.

Before introducing the method for determining a utilization rate of wireless resources and the apparatus for determining a utilization rate of wireless resources, the electronic device and the storage medium provided in the present disclosure in detail, an application scenario, an implementation environment and related elements involved in the present disclosure will be briefly introduced.

First, the application scenario involved in the present disclosure are introduced briefly.

A utilization rate of wireless resources of a network reflects resource occupancy of the network. At present, the utilization rate of wireless resources in 5G network is calculated according to a maximum capability of a cell, i.e., the utilization rate of wireless resources of the network in each time slot is calculated according to 273 PRBs, a maximum downlink configured layer number 16, and a maximum uplink configured layer number 8. A specific calculation formula for the utilization rate of wireless resources is expressed as: the utilization rate of wireless resources=(a total number of channel non-space division occupied PRBs×a configured layer number of a cell+a total number of channel space division occupied PRBs)/(a total number of channel available PRBs×the configured layer number of the cell)×100%.

In the related art, the utilization rate of wireless resources in the 5G network is currently calculated only according to the maximum network capability, i.e., a full bandwidth PRB and a maximum configured layer number. However, in an actual network scenario, due to geographical environments of cells, actual distribution of users, an occurrence time of business and the like, an actual capability of a cell changes dynamically. If the utilization rate of wireless resources is calculated only according to the maximum network capability, a calculation result will be too low, a load of a network cannot be truly and effectively reflected, and a reference value is lost.

In view of the above-mentioned problem, the present disclosure provides a method for determining a utilization rate of wireless resources. A channel non-space division occupied wireless resource and a channel available wireless resource are calculated by using a maximum scheduling layer number for a cell within a statistical period, and then, a utilization rate of wireless resources is determined according to the channel non-space division occupied wireless resource, the channel space division occupied wireless resource, and the channel available wireless resource, therefore a limitation of geographical environments of cells and an actual distribution of users on the wireless resource capability of the cell are taken into account, so that the accuracy of a calculating result of a utilization rate of wireless resources is improved and a load situation of a network can be truly and effectively reflected.

Secondly, the relevant elements involved in the present disclosure is introduced briefly.

SU-MIMO (i.e., "single user-multiple inputs multiple outputs"): a network communication rate between a router and a client device is improved by a transmission mode of multi-links simultaneous transmission. However, multiple parallel data streams occupying a same time-frequency resource can only be transmitted to a same user or transmitted from the same user to a base station. Therefore, even if the client device cannot fully occupy a wireless bandwidth of the router, remaining bandwidth cannot be allocated by the router to other devices for usage.

MU-MIMO (i.e., "multiple users-multiple inputs multiple outputs"): a multi-user simultaneous communication mechanism is added on a basis of SU-MIMO. Multiple users share a same time-frequency resource by space division, and a system can acquire additional multi-user diversity gain by multi-user scheduling in spatial dimension. In a same time and a same frequency band, the router can communicate with multiple client devices, and thus, MU-MIMO can utilize all wireless bandwidths and improves the network resource utilization rate in a case of multi-user access.

It should be noted that a switch may be used by the network to control whether to enable the MU-MIMO.

The channel refers to a physical downlink shared channel (PDSCH) and a physical uplink share channel (PUSCH).

One more, the implementation environment (implementation architecture) involved in the present disclosure is introduced briefly below.

The method for determining a utilization rate of wireless resources provided in the embodiments of the present disclosure may be applied to an electronic device. The electronic device may be a terminal device or a server. The terminal device may be a smart phone, a tablet computer, a handheld computer, a vehicle terminal, a desktop computer, or a laptop computer, etc. The server may be any server or server cluster, to which the present disclosure does not limit.

In order to facilitate understanding, the method for determining a utilization rate of wireless resources provided in the present disclosure is introduced in detail below in combination with the accompanying drawings.

FIG. 1 is a flowchart illustrating a method for determining a utilization rate of wireless resources according to an exemplary embodiment, where the method for determining a utilization rate of wireless resources is suitable for an electronic device. As shown in FIG. 1, the method for determining a utilization rate of wireless resources includes S101 to S105.

In S101, communication data within a statistical period of a cell is acquired. The communication data includes: a total number of channel non-space division occupied PRBs in each time slot, a total number of channel space division occupied PRBs in each time slot, a maximum scheduling layer number in each time slot and a total number of channel available PRBs. In the embodiments of the present disclosure, only a time slot is taken as an example for explanation, and in specific applications, the solution of the present disclosure can also be implemented based on other time-domain resources (such as symbols), which is not limited thereto in the present disclosure.

It should be noted that for an LTE radio frame structure, each time slot is 0.5 ms. That is, in the embodiments of the present disclosure, each time slot is 0.5 ms.

In an implementation, the statistical period may be any one of 0.1 minute, 30 minutes, 60 minutes, and 120 minutes, to which the present disclosure does not limit.

It can be understood that after a duration of the statistical period is determined, a number of time slots in the statistical period is a fixed value.

Exemplarily, if the statistical period is 0.1 minute, there are 12 time slots within the statistical period.

In S102, a channel non-space division occupied wireless resource within the statistical period is determined according to the total number of channel non-space division occupied PRBs in each time slot and the maximum scheduling layer number in each time slot.

Exemplarily, the channel non-space division occupied wireless resource within the statistical period satisfies the following formula:

$$T1 = \sum_{i=1}^{n} PRB_i * \text{Layer}_i$$

T1 characterizes the channel non-space division occupied wireless resource within the statistical period, the i characterizes an i-th time slot within the statistical period, $PRB_i$ characterizes a total number of channel non-space division occupied PRBs in the i-th time slot, and $\text{Layer}_i$ characterizes a maximum scheduling layer number in the i-th time slot within the statistical period, n is a positive integer.

In an embodiment, $\text{Layer}_i$ is a positive integer.

The maximum scheduling layer number is used to determine the channel non-space division occupied wireless resource within the statistical period, and thus, a limitation of a geographical environment of a cell and the actual distribution of the users on the wireless resource capability of the cell is taken into account, such that the accuracy of the channel non-space division occupied wireless resource is improved, thereby enabling to reflect the utilization rate of wireless resources of the cell more truly and effectively.

In S103, a channel space division occupied wireless resource within the statistical period is determined according to the total number of channel space division occupied PRBs in each time slot.

In an embodiment, the total number of channel space division occupied PRBs in each time slot includes a number of channel space division occupied PRBs occupying j layers in each time slot, and j characterizes an actual number of occupied layers, j is a positive integer.

Exemplarily, the channel space division occupied wireless resource within the statistical period satisfies the following formula:

$$T2 = \sum_{i=1}^{n} \left( \sum_{j=1}^{m} PRB_{i,j} * j \right)$$

T2 characterizes the channel space division occupied wireless resource within the statistical period, the i characterizes an i-th time slot within the statistical period, $PRB_{i,j}$ characterizes a number of channel space division occupied PRBs occupying j layers in the i-th time slot, and j characterizes a number of occupied layers; n is a positive integer, m is a positive integer, and j is a positive integer.

In S104, a channel available wireless resource within the statistical period is determined according to the total number of channel available PRBs and the maximum scheduling layer number in each time slot.

In an implementation, first, an average maximum scheduling layer number within the statistical period is determined according to maximum scheduling layer numbers in respective time slots, and then, an available channel wireless resource within the statistical period is determined according to the total number of channel available PRBs and the average maximum scheduling layer number within the statistical period.

Exemplarily, the average maximum scheduling layer number within the statistical period satisfies the following formula:

$$L = \frac{\sum_{i=1}^{n} \text{Layer}_i}{k}$$

L characterizes the average maximum scheduling layer number within the statistical period, the i characterizes an i-th time slot within the statistical period, $\text{Layer}_i$ characterizes a maximum scheduling layer number in the i-th time slot, and k characterizes a number of time slots with the maximum scheduling layer number; n is a positive integer, $\text{Layer}_i$ is a positive integer, and k is a positive integer.

Exemplarily, the channel available wireless resource within the statistical period satisfies the following formula:

$$T3 = B * L * n$$

T3 characterizes the channel available wireless resource within the statistical period, L characterizes the average maximum scheduling layer number within the statistical period, the n characterizes a number of time slots within the statistical period, n is a positive integer, and the B characterizes a configured number of PRBs in each time slot.

It should be noted that in the implementation of the present disclosure, B is configured with a maximum configured number of PRBs in the 5G NR, that is, B is configured with 273 PRBs.

In S105, a utilization rate of wireless resources is determined according to the channel non-space division occupied wireless resource within the statistical period, the channel space division occupied wireless resource within the statistical period, and the channel available wireless resource within the statistical period.

Exemplarily, the utilization rate of wireless resources satisfies the following formula:

the utilization rate of wireless resources=(the channel non-space division occupied wireless resource within the statistical period+the channel space division occupied wireless resource within the statistical period)/the channel available wireless resource within the statistical period.

In an example, the cell is a MU-MIMO cell. It is assumed that there are 3 time slots in the statistical period. In a first time slot, there are 30 PRBs occupying 2 layers, 30 PRBs occupying 3 layers, and 100 PRBs occupying 5 layers. In a second time slot, there are 40 PRBs occupying 1 layer, 70 PRBs occupying 3 layers, and 90 PRBs occupying 6 layers. A third time slot is not occupied.

According to this example, there is no channel non-space division occupied wireless resource included within the statistical period, that is, the channel non-space division occupied wireless resource within the statistical period is expressed as T1=0, and the channel space division occupied wireless resource within the statistical period is expressed as $$T2 = \sum_{i=1}^{n}\left(\sum_{j=1}^{m} PRB_{i,j} * j\right) =$$
$$30*2 + 30*3 + 100*5 + 40*1 + 70*3 + 90*6 = 1440.$$

The average maximum scheduling layer within the statistical period is expressed as $$L = \frac{\sum_{i=1}^{n} \mathrm{Layer}_i}{k} = (5+6)/2 = 5.5.$$

The channel available wireless resource within the statistical period is expressed as T3=B*L*n=273*5.5*3=4504.5. The utilization rate of wireless resources within the statistical period is equal to (T1+T2)/T3=(0+1440)/4504.5=31.86%.

In an example, the cell is a MU-MIMO cell. It is assumed that there are 3 time slots within the statistical period. In a first time slot, there are 10 non-space division PRBs; and there are 30 PRBs occupying 2 layers, 30 PRBs occupying 3 layers, and 100 PRBs occupying 5 layers. In a second time slot, there are 20 non-space division PRBs; and there are 40 PRBs occupying 1 layer, 70 PRBs occupying 3 layers, and 90 PRBs occupying 6 layers. A third time slot is not occupied.

According to this example, the channel non-space division occupied wireless resource is expressed as $$T1 = \sum_{i=1}^{n} PRB_i * \mathrm{Layer}_i = 10*5 + 20*6 = 170$$

within the statistical period, and the channel space division occupied wireless resource within the statistical period is expressed as $$T2 = \sum_{i=1}^{n}\left(\sum_{j=1}^{m} PRB_{i,j} * j\right) =$$
$$30*2 + 30*3 + 100*5 + 40*1 + 70*3 + 90*6 = 1440.$$

The average maximum scheduling layer number within the statistical period is expressed as $$L = \frac{\sum_{i=1}^{n} \mathrm{Layer}_i}{k} = (5+6)/2 = 5.5.$$

The channel available wireless resource within the statistical period is expressed as T3=B*L*n=273*5.5*3=4504.5. The utilization rate of wireless resources within the statistical period is equal to (T1+T2)/T3=(170+1440)/4504.5=35.74%.

In an example, the cell is a MU-MIMO cell. It is assumed that there are 3 time slots within the statistical period. In a first time slot, there are 30 PRBs occupying 2 layers, 30 PRBs occupying 3 layers, and 100 PRBs occupying 5 layers. In a second time slot, there are 40 PRBs occupying 1 layer, 70 PRBs occupying 3 layers, and 90 PRBs occupying 6 layers. In a third time slot, there are 50 PRBs occupying 2 layers, 80 PRBs occupying 3 layers, and 80 PRBs occupying 7 layers.

Based on the above-mentioned example, the channel non-space division occupied wireless resource within the statistical period is expressed as T1=0, and the channel space division occupied wireless resource within the statistical period is expressed as $$T2 = \sum_{i=1}^{n}\left(\sum_{j=1}^{m} PRB_{i,j} * j\right) = 30*2 + 30*3 +$$
$$100*5 + 40*1 + 70*3 + 90*6 + 50*2 + 80*3 + 80*7 = 2340.$$

The average maximum scheduling layer number within the statistical period is expressed as $$L = \frac{\sum_{i=1}^{n} \mathrm{Layer}_i}{k} = (5+6+7)/3 = 6.$$

The channel available wireless resource within the statistical period is expressed as T3=B*L*n=273*6*3=4914. The utilization rate of wireless resources within the statistical period is equal to (T1+T2)/T3=(0+2340)/4914=47.62%.

In the above-mentioned embodiment, a channel non-space division occupied wireless resource and a channel available wireless resource are calculated by using a maximum scheduling layer number for a cell within a statistical period, and then, a utilization rate of wireless resources are determined according to the channel non-space division occupied wireless resource, the channel space division occupied wireless resource, and the channel available wireless resource, therefore a limitation of geographical environments of cells and an actual distribution of users on the wireless resource capability of the cell are taken into account, so that the accuracy of a calculating result of a utilization rate of wireless resources is improved and a load situation of a network can be truly and effectively reflected.

In an implementation, as shown in FIG. 2 and in combination with FIG. 1, before the communication data within the statistical period of the cell is acquired, the method for determining a utilization rate of wireless resources further includes S106 to S109.

In S106, MIMO configuration information of the cell is acquired.

In an embodiment, the MIMO configuration information includes at least one of first configuration information, second configuration information and third configuration information.

Exemplarily, the first configuration information is used to correspondingly enable only an SU-MIMO mode. The second configuration information is used to correspondingly enable only a MU-MIMO mode. The third configuration information is used to correspondingly enable the SU-MIMO mode and the MU-MIMO mode simultaneously.

In an implementation, different cells have different MIMO configuration information.

In S107, whether the MU-MIMO mode is enabled for the cell is judged according to the MIMO configuration information. In a case where a judgment result is yes, S101 is proceeded, and in a case where the judgment result is no, S108 is proceeded.

In an implementation, the second configuration information and the third configuration information correspond to the MU-MIMO mode being enabled for the cell. In this case, the cell is a MU-MIMO cell.

In another implementation, the first configuration information corresponds to the MU-MIMO mode being un-enabled for the cell. In this case, the cell is an SU-MIMO cell.

In S108, a total number of channel occupied PRBs and a total number of channel available PRBs within the statistical period are acquired.

In an implementation, the total number of channel occupied PRBs may be a total number of downlink PDSCH channel occupied PRBs in the cell.

In another implementation, the total number of channel occupied PRBs may be a total number of uplink PUSCH channel occupied PRBs in the cell.

In yet another implementation, the total number of channel occupied PRBs is an average of the total number of downlink PDSCH channel occupied PRBs in the cell and the total number of uplink PUSCH channel occupied PRBs in the cell.

In S109, a utilization rate of wireless resources is determined according to the total number of channel occupied PRBs and the total number of channel available PRBs within the statistical period.

In an embodiment, the utilization rate of wireless resources satisfies the following formula: the utilization rate of wireless resources=the total number of channel occupied PRBs within the statistical period/the total number of channel available PRBs within the statistical period.

Exemplarily, the cell is in an SU-MIMO mode. During the statistical period, the total number of downlink PDSCH channel occupied PRBs in the cell is 200, the total number of downlink PDSCH channel available PRBs in the cell is 273, and then a downlink utilization rate of wireless resources in the cell is 200/273=73.3%.

Exemplarily, the cell is in an SU-MIMO mode. During the statistical period, the total number of uplink PUSCH channel occupied PRBs in the cell is 210, the total number of uplink PUSCH channel available PRBs in the cell is 273, and then a uplink utilization rate of wireless resources in the cell is 210/273=76.9%.

Exemplarily, the cell is an SU-MIMO mode. During the statistical period, the total number of downlink PDSCH channel occupied PRBs in the cell is 200, the total number of uplink PUSCH channel occupied in the cell is 210, the total number of channel occupied PRBs in the cell is 205, the total number of channel available PRBs in the cell is 273, and then the utilization rate of wireless resources of the cell is 205/273=75.1%.

In the above-mentioned embodiment, a calculation method for determining a utilization rate of wireless resources is according to whether the MU-MIMO mode is enabled in the cell, and configures different calculation modes of a utilization rate of wireless resources for the SU-MIMO cell and the MU-MIMO cell. For an SU-MIMO cell, the limitation of the geographical environments of the cells and the actual distribution of the users on the wireless resource capability of the cell is not necessary to be taken into account, thereby improving the accuracy and the efficiency of the calculation of the utilization rate of wireless resources by determining the utilization rate of wireless resources through the total number of channel occupied PRBs and the total number of channel available PRBs quickly. For an MU-MIMO cell, both a time-frequency resource and an airspace resource are taken into account to determine the utilization rate of wireless resources of the 5G network; and the limitation of the geographical environments of the cells and the actual distribution of the users on the wireless resource capability of the cell is taken into account. The utilization rate of wireless resources is determined according to the channel non-space division occupied wireless resource within the statistical period, the channel space division occupied wireless resource within the statistical period and the channel available wireless resource within the statistical period, such that the accuracy of the calculation result of the utilization rate of wireless resources is increased, and the load of the network is truly and effectively reflected.

In an embodiment, an implementation of the present disclosure further provides another method for determining a utilization rate of wireless resources. Exemplarily, the method for determining a utilization rate of wireless resources includes S201 to S204.

In S201, communication data within a statistical period of a cell is acquired. The communication data includes: a total number of channel space division occupied PRBs in each time slot, a maximum scheduling layer number in each time slot, and a total number of channel available PRBs.

It should be noted that an implementation principle of S201 is the same as that of S101. Therefore, an implementation process and related explanation of S201 may be referred to S101, which will not be repeated herein.

In S202, a channel space division occupied wireless resource within the statistical period is determined according to the total number of channel space division occupied PRBs in each time slot.

It should be noted that an implementation principle of S202 is the same as that of S103. Therefore, an implementation process and related explanation of S202 may be referred to S103, which will not be repeated herein.

In S203, a channel available wireless resource within the statistical period is determined according to the total number of channel available PRBs and the maximum scheduling layer number in each time slot.

It should be noted that an implementation principle of S203 is the same as that of S104. Therefore, an implementation process and related explanation of S203 may be referred to S104, which will not be repeated herein.

In S204, a utilization rate of wireless resources is determined according to the channel space division occupied wireless resource within the statistical period and the channel available wireless resource within the statistical period.

Exemplarily, the utilization rate of wireless resources satisfies the following formula:

the utilization rate of wireless resources=the channel space division occupied wireless resource within the statistical period/the channel available wireless resource within the statistical period.

Exemplarily, the cell is a MU-MIMO cell. It is assumed that there are 3 time slots within the statistical period. In a first time slot, there are 30 PRBs occupying 2 layers, 30 PRBs occupying 3 layers, and 100 PRBs occupying 5 layers. In a second time slot, there are 40 PRBs occupying 1 layer, 70 PRBs occupying 3 layers, and 90 PRBs occupying 6 layers. A third time slot is not occupied.

According to this example, the channel space division occupied wireless resource within the statistical period is expressed as $$T2 = \sum_{i=1}^{n} \left( \sum_{j=1}^{m} PRB_{i,j} * j \right) =$$
$$30*2 + 30*3 + 100*5 + 40*1 + 70*3 + 90*6 = 1440.$$

The average maximum scheduling layer L within the statistical period is expressed as $$L = \frac{\sum_{i=1}^{n} \text{Layer}_i}{k} = (5+6)/2 = 5.5.$$

The channel available wireless resource within the statistical period is expressed as T3=B*L*n=273*5.5*3=4504.5. The utilization rate of wireless resources within the statistical period is equal to (T1+T2)/T3=1440/4504.5=31.86%.

In an example, the cell is a MU-MIMO cell. It is assumed that there are 3 time slots within the statistical period. In a first time slot, there are 30 PRBs occupying 2 layers, 30 PRBs occupying 3 layers, and 100 PRBs occupying 5 layers. In a second time slot, there are 40 PRBs occupying 1 layer, 70 PRBs occupying 3 layers, 90 PRBs occupying 6 layers. In a third time slot, there are 50 PRBs occupying 2 layers, 80 PRBs occupying 3 layers, and 80 PRBs occupying 7 layers.

Based on the above-mentioned example, the channel space division occupied wireless resource within the statistical period is expressed as $$T2 = \sum_{i=1}^{n} \left( \sum_{j=1}^{m} PRB_{i,j} * j \right) = 30*2 + 30*3 +$$
$$100*5 + 40*1 + 70*3 + 90*6 + 50*2 + 80*3 + 80*7 = 2340.$$

The average maximum scheduling layer number within the statistical period is expressed as $$L = \frac{\sum_{i=1}^{n} \text{Layer}_i}{k} = (5+6+7)/3 = 6.$$

The channel available wireless resource within the statistical period is expressed as T3=B*L*n=273*6*3=4914. The utilization rate of wireless resources within the statistical period is equal to (T1+T2)/T3=2340/4914=47.62%.

In the above-mentioned embodiment, a channel available wireless resource is calculated by using a maximum scheduling layer number for a cell within a statistical period, and then, a utilization rate of wireless is determined according to the channel space division occupied wireless resource, and the channel available wireless resource, therefore a limitation of geographical environments of cells and an actual distribution of users on the wireless resource capability of the cell are taken into account, so that the accuracy of a calculating result of a utilization rate of wireless resources is improved and a load situation of a network can be truly and effectively reflected.

It should be noted that other relevant explanations of S204 may be referred to S105, which will not be repeated herein.

In an embodiment, an implementation of the present disclosure further provides a method for determining an average maximum scheduling layer number within a statistical period. Exemplarily, the method for determining an average maximum scheduling layer number within a statistical period includes S301.

In S301, the average maximum scheduling layer number within the statistical period is determined according to maximum scheduling layer numbers in respective time slots. The average maximum scheduling layer number within the statistical period satisfies the following formula:

$$L = \frac{\sum_{i=1}^{n} \text{Layer}_i}{k}$$

L characterizes the average maximum scheduling layer number within the statistical period, i characterizes an i-th time slot within the statistical period, Layer characterizes a maximum scheduling layer number in the i-th time slot, and k characterizes a number of time slots with the maximum scheduling layer number; n is positive integer, $\text{Layer}_i$ is a positive integer, k is a positive integer.

It should be noted that relevant explanation of S401 is explained in S104, which will not be repeated herein.

The solutions provided in the embodiments of the present disclosure is introduced above from the perspective of methods. In order to achieve the above-mentioned functions, the solutions include a corresponding hardware structure and/or software module for performing various functions. A person skilled in the art will be easy to conceive that units and algorithm steps of the examples described in combination with the embodiments disclosed herein may be implemented via a hardware or a combination of a hardware and a computer software in the present disclosure. Whether a certain function is performed via the hardware or the computer software-driven hardware depends on the specific application and restrictive conditions on design of the technical solution. A skilled person may use different methods for each specific application to implement the described functions, but such implementation should not be considered beyond the scope of the present disclosure.

An embodiment of the present disclosure further provides an apparatus for determining a utilization rate of wireless resources.

Figure 3:
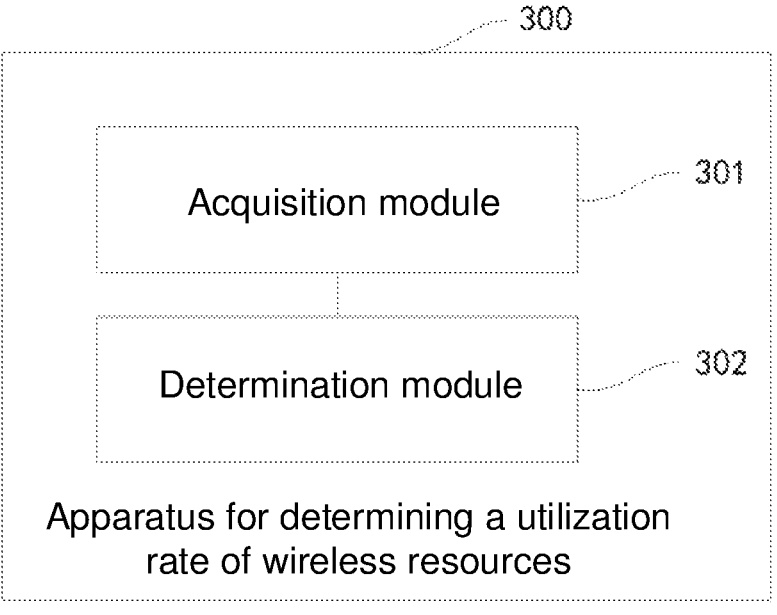
FIG. 3 is a block diagram illustrating an apparatus for determining a utilization rate of wireless resources according to some exemplary embodiments.

FIG. 3 is a block diagram of an apparatus for determining a utilization rate of wireless resources according to an exemplary embodiment. As shown in FIG. 3, the apparatus includes an acquisition module 301 and a determination module 302.

The acquisition module 301 is configured to perform: acquiring communication data within a statistical period of a cell. The communication data includes: a total number of channel non-space division occupied PRBs in each time slot, a total number of channel space division occupied PRBs in each time slot, a maximum scheduling layer number in each time slot, and a total number of channel available PRBs. For example, in combination with FIG. 1, the acquisition module 301 may be configured to perform S101.

The determination module 302 is configured to perform: determining a channel non-space division occupied wireless resource within the statistical period according to the total number of channel non-space division occupied PRBs in each time slot and the maximum scheduling layer number in each time slot. For example, in combination with FIG. 1, the determination module 302 may be configured to perform S102.

The determination module 302 is further configured to perform: determining a channel space division occupied wireless resource within the statistical period according to the total number of channel space division occupied PRBs in each time slot. For example, in combination with FIG. 1, the determination module 302 may be configured to perform S103.

The determination module 302 is further configured to perform: determining a channel available wireless resource within the statistical period according to the total number of channel available PRBs and the maximum scheduling layer number in each time slot. For example, in combination with FIG. 1, the determination module 302 may be configured to perform S104.

The determination module 302 is further configured to perform: determining a utilization rate of wireless resources according to the channel non-space division occupied wireless resource within the statistical period, the channel space division occupied wireless resource within the statistical period, and the channel available wireless resource within the statistical period. For example, in combination with FIG. 1, the determination module 302 may be configured to perform S105.

In an implementation, the channel non-space division occupied wireless resource within the statistical period satisfies the following formula:

$$T1 = \sum_{i=1}^{n} PRB_i * \text{Layer}_i$$

T1 characterizes the channel non-space division occupied wireless resource within the statistical period, the i characterizes an i-th time slot within the statistical period, $PRB_i$ characterizes a total number of channel non-space division occupied PRBs in the i-th time slot, and $\text{Layer}_i$ characterizes a maximum scheduling layer number in the i-th time slot within the statistical period, n is a positive integer.

In another implementation, the channel space division occupied wireless resource within the statistical period satisfies the following formula:

$$T2 = \sum_{i=1}^{n} \left( \sum_{j=1}^{m} PRB_{i,j} * j \right)$$

T2 characterizes the channel space division occupied wireless resource within the statistical period, i characterizes an i-th time slot within the statistical period, $PRB_{i,j}$ characterizes a number of channel space division occupied PRBs occupying j layers in the i-th time slot, and j characterizes a number of occupied layers; n is a positive integer, m is a positive integer, and j is a positive integer.

In another implementation, the determination module is specifically configured to perform: determining an average maximum scheduling layer number within the statistical period according to maximum scheduling layer numbers in respective time slots; and determining a channel available wireless resource within the statistical period according to the total number of channel available PRBs and the average maximum scheduling layer number within the statistical period.

In another implementation, the average maximum scheduling layer number within the statistical period satisfies the following formula:

$$L = \frac{\sum_{i=1}^{n} \text{Layer}_i}{k}$$

L characterizes the average maximum scheduling layer number within the statistical period, i characterizes an i-th time slot within the statistical period, $\text{Layer}_i$ characterizes a maximum scheduling layer number in the i-th time slot, and k characterizes a number of time slots with the maximum scheduling layer number; n is positive integer, $\text{Layer}_i$ is a positive integer, and k is a positive integer.

In another implementation, the channel available wireless resource within the statistical period satisfies the following formula:

$$T3 = B * L * n$$

T3 characterizes the channel available wireless resource within the statistical period, L characterizes the average maximum scheduling layer number within the statistical period, the n characterizes a number of time slots within the statistical period, n is a positive integer and B characterizes a configured number of PRBs in each time slot.

In another implementation, the utilization rate of wireless resources satisfies the following formula:

the utilization rate of wireless resources=(the channel non-space division occupied wireless resource within the statistical period+the channel space division occupied wireless resource within the statistical period)/the channel available occupied wireless resource within the statistical period.

In another implementation, the apparatus for determining a utilization rate of wireless resources further includes a configuration module, configured to perform: acquiring MIMO configuration information of the cell; determining whether a MU-MIMO mode is enabled for the cell according to the MIMO configuration information; and acquiring the communication data within the statistical period of the cell in a case where the MU-MIMO mode is determined to be enabled for the cell.

In another implementation, the configuration module is further configured to perform: acquiring a total number of channel occupied PRBs and a total number of channel available PRBs within the statistical period in a case where the MU-MIMO mode is determined to be not enabled for the cell; and determining a utilization rate of wireless resources according to the total number of channel occupied PRBs and the total number of channel available PRBs within the statistical period.

Regarding the apparatus in the above-mentioned embodiments, specific modes in which respective modules thereof perform operations have been described in detail in the embodiments related to the method, which will not be repeated herein.

Figure 4:
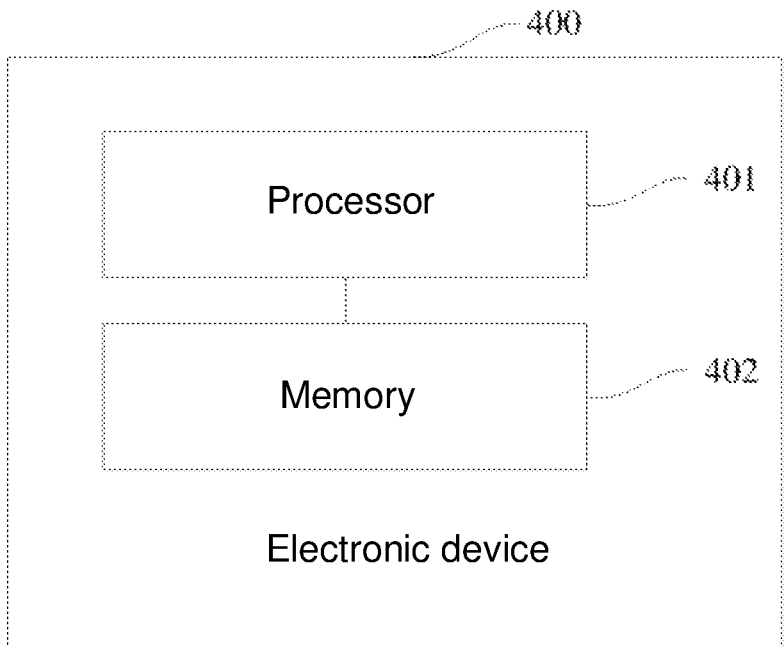
FIG. 4 is a block diagram illustrating an electronic device according to some exemplary embodiments.

FIG. 4 is a block diagram of an electronic device 400 according to an exemplary embodiment. As shown in FIG. 4, the electronic device 400 includes but does not limit to: a processor 401 and a memory 402.

The above-mentioned memory 402 is used to store instructions executable by the above-mentioned processor 401. It can be understood that the above-mentioned processor 401 is configured to execute the instructions to implement the method for determining a utilization rate of wireless resources shown in any one of FIG. 1 or FIG. 2 of the above-mentioned embodiments.

It should be noted that those skilled in the art can understand that a structure of the electronic device shown in FIG. 4 does not constitute a limitation on the electronic device. The electronic device may include more or fewer components than those shown in FIG. 4, or a combination of certain components, or different component arrangements.

The processor 401, as a control center of the electronic device, adapts various interfaces and lines to connect various parts of the entire electronic device, and performs various functions of the electronic device and processes data by running or executing software programs stored in the memory 402 and/or modules and calling data stored in the memory 402, so as to monitor the electronic apparatus as a whole. In an embodiment, the processor 401 may integrate with an application processor and a modem processor, where the application processor mainly handles an operating system, a user interface, and an application program, etc., and the modem processor mainly handles wireless communication. It can be understood that the above-mentioned modem processor may not be integrated in the processor 401.

The memory 402 may be used to store a software program and various data. The memory 402 may mainly include a region for storing a program and a region for storing data, where the region for storing the program may store an operating system, an application program required by at least one function unit (e.g., the acquisition module 301 and the determination module 302, etc.), and the like. In addition, the memory 402 may include a high-speed random access memory and may further include a non-volatile memory, such as at least one disk storage device, a flash memory device, or other volatile solid-state storage devices.

In an exemplary embodiment, an embodiment of the present disclosure further provides a computer-readable storage medium including instructions, such as the memory 402 including instructions. The above-mentioned instructions may be executed by the processor 401 of the electronic device 400 to complete the method for determining a utilization rate of wireless resources shown in any one of FIG. 1 or FIG. 2 of the above-mentioned embodiments.

In actual implementation, the acquisition module 301 and the determination module 302 may be implemented by the processor 401 calling computer program codes in the memory 402 as shown in FIG. 4. A specific implementation process of the above modules may be referred to the description of the method for determining a utilization rate of wireless resources shown in any one of FIG. 1 or FIG. 2, which will not be repeated herein.

In an embodiment, the computer-readable storage medium may be a non-transitory computer-readable storage medium. For example, the non-transitory computer-readable storage medium may be a read-only memory (ROM) or a random access memory (RAM), CD-ROM, a tape, a floppy disk and an optical data storage device, etc.

It should be noted that when the instructions in the above-mentioned computer-readable storage medium are executed by the processor 401 of the electronic device 400, respective processes of the embodiments of the above-mentioned method for determining a utilization rate of wireless resources are implemented, and can achieve the same technical effects as the method for determining a utilization rate of wireless resources shown in any one of FIG. 1 or FIG. 2 of the above-mentioned embodiments, which will not be described again for avoiding repetition.

Those skilled in the art, after considering the specification and practicing the contents disclosed herein, will easily conceive of other implementation in the present disclosure. The present aims to cover any variations, usage, or adaptive changes in the present disclosure, and these variations, usage, or adaptive changes follow the general principles of the present disclosure and include common knowledge or customary technical means in the art not disclosed in the present disclosure. The specification and the embodiments are only regarded as being exemplary, and a true scope and spirit of the present disclosure are indicated by the following claims.

It should be understood that the present disclosure is not limited to the precise structure described above and shown in the drawings, and various modifications and changes can be made without departing from its scope. The scope of the present disclosure is limited only by the appended claims.

What is claimed is:

1. A method for determining a utilization rate of wireless resources, comprising:

acquiring communication data within a statistical period of a cell, wherein the communication data comprises: a total number of channel non-space division occupied physical resource blocks (PRBs) in each time slot, a total number of channel space division occupied PRBs in each time slot, a maximum scheduling layer number in each time slot and a total number of channel available PRBs;

determining a channel non-space division occupied wireless resource within the statistical period according to the total number of channel non-space division occupied PRBs in each time slot and the maximum scheduling layer number in each time slot;

determining a channel space division occupied wireless resource within the statistical period according to the total number of channel space division occupied PRBs in each time slot;

determining a channel available wireless resource within the statistical period according to the total number of channel available PRBs and the maximum scheduling layer number in each time slot; and determining the utilization rate of wireless resources according to the channel non-space division occupied wireless resource within the statistical period, the channel space division occupied wireless resource within the statistical period, and the channel available wireless resource within the statistical period.

2. The method for determining a utilization rate of wireless resources according to claim 1, wherein the channel non-space division occupied wireless resource within the statistical period satisfies the following formula:

$$T1 = \sum_{i=1}^{n} PRB_i * \text{Layer}_i$$

wherein the T1 characterizes the channel non-space division occupied wireless resource within the statistical period, the i characterizes an i-th time slot within the statistical period, the $PRB_i$ characterizes the total number of channel non-space division occupied PRBs in the i-th time slot, and the $\text{Layer}_i$ characterizes the maximum scheduling layer number in the i-th time slot within the statistical period, n is a positive integer.

3. The method for determining a utilization rate of wireless resources according to claim 1, wherein the channel space division occupied wireless resource within the statistical period satisfies the following formula:

$$T2 = \sum_{i=1}^{n}\left(\sum_{j=1}^{m} PRB_{i,j} * j\right)$$

wherein the T2 characterizes the channel space division occupied wireless resource within the statistical period, the i characterizes an i-th time slot within the statistical period, the $PRB_{i,j}$ characterizes a number of channel space division occupied PRBs occupying j layers in the i-th time slot, and the j characterizes an occupied layer number; n is a positive integer, m is a positive integer, and j is a positive integer.

4. The method for determining a utilization rate of wireless resources according to claim 1, wherein the determining the channel available wireless resource within the statistical period according to the total number of channel available PRBs and the maximum scheduling layer number in each time slot comprises:

determining an average maximum scheduling layer number within the statistical period according to maximum scheduling layer numbers in respective time slots; and determining the channel available wireless resource within the statistical period according to the total number of channel available PRBs and the average maximum scheduling layer number within the statistical period.

5. The method for determining a utilization rate of wireless resources according to claim 4, wherein the average maximum scheduling layer number within the statistical period satisfies the following formula:

$$L = \frac{\sum_{i=1}^{n} \text{Layer}_i}{k}$$

wherein the L characterizes the average maximum scheduling layer number within the statistical period, the i characterizes an i-th time slot within the statistical period, the $\text{Layer}_i$ characterizes a maximum scheduling layer number in the i-th time slot, and the k characterizes a number of time slots with the maximum scheduling layer number; n is a positive integer, $\text{Layer}_i$ is a positive integer, and k is a positive integer.

6. The method for determining a utilization rate of wireless resources according to claim 5, wherein the channel available wireless resource within the statistical period satisfies the following formula:

$$T3 = B * L * n$$

wherein the T3 characterizes the channel available wireless resource within the statistical period, the L characterizes the average maximum scheduling layer number within the statistical period, the n characterizes a number of time slots within the statistical period, n is a positive integer and the B characterizes a configured number of PRBs in each time slot.

7. The method for determining a utilization rate of wireless resources according to claim 1, wherein the utilization rate of wireless resources satisfies the following formula:

the utilization rate of wireless resources=(the channel non–space division occupied wireless resource within the statistical period+the channel space division occupied wireless resource within the statistical period)/the channel available wireless resource within the statistical period.

8. The method for determining a utilization rate of wireless resources according to claim 1, wherein before the acquiring the communication data within the statistical period of the cell, the method for determining a utilization rate of wireless resources further comprises:

acquiring multiple inputs multiple outputs (MIMO) configuration information of the cell;

determining whether a multiple users-multiple inputs multiple outputs (MU-MIMO) mode is enabled for the cell according to the MIMO configuration information; and acquiring the communication data within the statistical period of the cell in a case where the MU-MIMO mode is determined to be enabled for the cell.

9. The method for determining a utilization rate of wireless resources according to claim 8, wherein the method for determining a utilization rate of wireless resources further comprises:

acquiring a total number of channel occupied PRBs and a total number of channel available PRBs within the statistical period in a case where the MU-MIMO mode is determined to be not enabled for the cell; and determining the utilization rate of wireless resources according to the total number of channel occupied PRBs and the total number of channel available PRBs within the statistical period.

10. A method for determining a utilization rate of wireless resources, comprising:

acquiring communication data within a statistical period of a cell, wherein the communication data comprises: a total number of channel space division occupied physical resource blocks (PRBs) in each time slot, a maximum scheduling layer number in each time slot, and a total number of channel available PRBs;

determining a channel space division occupied wireless resource within the statistical period according to the total number of channel space division occupied PRBs in each time slot;

determining a channel available wireless resource within the statistical period according to the total number of channel available PRBs and the maximum scheduling layer number in each time slot; and determining the utilization rate of wireless resources according to the channel space division occupied wireless resource within the statistical period and the channel available wireless resource within the statistical period.

11. The method for determining a utilization rate of wireless resources according to claim 10, wherein the channel space division occupied wireless resource within the statistical period satisfies the following formula:

$$T2 = \sum_{i=1}^{n}\left(\sum_{j=1}^{m} PRB_{i,j} * j\right)$$

wherein the T2 characterizes the channel space division occupied wireless resource within the statistical period, the i characterizes an i-th time slot within the statistical period, the $PRB_{i,j}$ characterizes a number of channel space division occupied PRBs occupying j layers in the i-th time slot, and the j characterizes an occupied layer number; n is a positive integer, m is a positive integer, and j is a positive integer.

12. The method for determining a utilization rate of wireless resources according to claim 10, wherein the determining the channel available wireless resource within the statistical period according to the total number of channel available PRBs and the maximum scheduling layer number in each time slot comprises:

determining an average maximum scheduling layer number within the statistical period according to maximum scheduling layer numbers in respective time slots; and determining the channel available wireless resource within the statistical period according to the total number of channel available PRBs and the average maximum scheduling layer number within the statistical period.

13. The method for determining a utilization rate of wireless resources according to claim 12, wherein the average maximum scheduling layer number within the statistical period satisfies the following formula:

$$L = \frac{\sum_{i=1}^{n} \text{Layer}_i}{k}$$

wherein the L characterizes the average maximum scheduling layer number within the statistical period, the i characterizes an i-th time slot within the statistical period, the $\text{Layer}_i$ characterizes a maximum scheduling layer number in the i-th time slot, and the k characterizes a number of time slots with the maximum scheduling layer number; n is a positive integer, $\text{Layer}_i$ is a positive integer, and k is a positive integer.

14. The method for determining a utilization rate of wireless resources according to claim 13, wherein the channel available wireless resource within the statistical period satisfies the following formula:

$$T3 = B * L * n$$

wherein the T3 characterizes the channel available wireless resource within the statistical period, the L characterizes the average maximum scheduling layer number within the statistical period, the n characterizes a number of time slots within the statistical period, n is a positive integer and the B characterizes a configured number of PRBs in each time slot.

15. The method for determining a utilization rate of wireless resources according to claim 13, wherein the channel available wireless resource within the statistical period satisfies the following formula:

$$T3 = \sum_{i=1}^{n} B_i * L$$

wherein the T3 characterizes the channel available wireless resource within the statistical period, the L characterizes the average maximum scheduling layer number within the statistical period, the i characterizes an i-th time slot within the statistical period, the n characterizes a number of time slots within the statistical period, n is a positive integer and the $B_i$ characterizes a configured number of PRBs in the i-th time slot.

16. The method for determining a utilization rate of wireless resources according to claim 10, wherein the utilization rate of wireless resources satisfies the following formula:

the utilization rate of wireless resources=the channel space division occupied wireless resource within the statistical period/the channel available wireless resource within the statistical period.

17. The method for determining a utilization rate of wireless resources according to claim 10, wherein before the acquiring the communication data within the statistical period of the cell, the method for determining a utilization rate of wireless resources further comprises:

acquiring multiple inputs multiple outputs (MIMO) configuration information of the cell;

determining whether a multiple users-multiple inputs multiple outputs (MU-MIMO) mode is enabled for the cell according to the MIMO configuration information; and acquiring the communication data within the statistical period of the cell in a case where the MU-MIMO mode is determined to be enabled in the cell, wherein the method for determining a utilization rate of wireless resources further comprises:

acquiring a total number of channel occupied RBs and a total number of channel available PRBs within the statistical period in a case where the MU-MIMO mode is determined to be not enabled for the cell; and determining the utilization rate of wireless resources according to the total number of channel occupied PRBs and the total number of channel available PRBs within the statistical period.

18. A method for determining an average maximum scheduling layer number within a statistical period, comprising:

determining an average maximum scheduling layer number within a statistical period according to a maximum scheduling layer number in each time slot, wherein the average maximum scheduling layer number within the statistical period satisfies the following formula:

$$L = \frac{\sum_{i=1}^{n} \text{Layer}_i}{k}$$

wherein the L characterizes the average maximum scheduling layer number within the statistical period, the i characterizes an i-th time slot within the statistical period, the $\text{Layer}_i$ characterizes a maximum scheduling layer number in the i-th time slot, and the k characterizes a number of time slots with the maximum scheduling layer number; n is a positive integer, $\text{Layer}_i$ is a positive integer, and k is a positive integer.

19. An electronic device, comprising:

a processor; and a memory for storing instructions executable by the processor;

wherein the processor is configured to execute the instructions to implement the method for determining a utilization rate of wireless resources according to claim 1.

20. A non-transitory computer-readable storage medium, wherein when instructions in the computer-readable storage medium are executed by a processor of an electronic device, the electronic device is enabled to implement the method for determining a utilization rate of wireless resources according to claim 1.

* * * * *